United States Patent
Parfondry et al.

(10) Patent No.: US 6,784,217 B2
(45) Date of Patent: Aug. 31, 2004

(54) PROCESS FOR MAKING HIGH RESILIENCE FOAMS

(75) Inventors: Alain Parfondry, Brussels (BE); Jianming Yu, Brussels (BE)

(73) Assignee: Huntsman International LLC, Salt Lake City, UT (US)

(*) Notice: Subject to any disclaimer, the term of this patent is extended or adjusted under 35 U.S.C. 154(b) by 0 days.

(21) Appl. No.: 10/458,901

(22) Filed: Jun. 11, 2003

(65) Prior Publication Data

US 2003/0212155 A1 Nov. 13, 2003

Related U.S. Application Data

(63) Continuation of application No. 10/122,454, filed as application No. PCT/EP00/09731 on Oct. 5, 2000, now Pat. No. 6,593,387.

(30) Foreign Application Priority Data

Nov. 2, 1999 (EP) .............................................. 99121697

(51) Int. Cl.$^7$ .............................................. C08G 18/10
(52) U.S. Cl. ....................... 521/130; 521/133; 521/137; 521/159; 521/160; 521/174; 521/904
(58) Field of Search .................. 521/130, 133, 521/137, 160, 159, 174, 904

(56) References Cited

U.S. PATENT DOCUMENTS

| | | | | | |
|---|---|---|---|---|---|
| 5,441,993 | A | * | 8/1995 | Maretti | 521/174 |
| 5,459,170 | A | * | 10/1995 | Bleys et al. | 521/125 |
| 5,521,226 | A | * | 5/1996 | Bleys | 521/174 |
| 5,840,782 | A | * | 11/1998 | Limerkens et al. | 521/174 |
| 6,031,010 | A | * | 2/2000 | Lin | 521/51 |

* cited by examiner

Primary Examiner—John M. Cooney, Jr.
(74) Attorney, Agent, or Firm—Nicole Graham

(57) ABSTRACT

A prepolymer process for preparing a high resilience flexible polyurethane foam by reacting a polyisocyanate composition comprising at least 80% by weight of 4,4'-MDI and having an NCO value below 20% with a polyol composition comprising b1) an EO-rich polyol; b2) a polyol with an EO content between 20–50% and a primary hydroxy content of at least 50%; and b3) a polyol with an EO content between 10–20% and a primary hydroxy content of at least 50%; according to the following proportions: b1: 40–90 wt %, b2: 5–60 wt %, b3: 0–20 wt %. The invention also relates to reaction systems comprising the above components.

20 Claims, No Drawings

PROCESS FOR MAKING HIGH RESILIENCE FOAMS

This application is a continuation of U.S. patent application Ser. No. 10/122,454, filed on Apr. 12, 2002, now U.S. Pat. No. 6,593,387 which is a continuation of international application number PCT EP00/09731, filed on Oct. 5, 2000, and further claims priority to foreign application number 99121697.9, filed on Nov. 2, 1999 in the EPO.

The instant invention relates to a process for making high resilience foams, and to reaction systems that are useful in the said process.

EP-A-0547765 to Bleys et al. discloses a process for making high resilience foams comprising reacting high 4,4' MDI with an EO-rich polyol. While the foams thus obtained exhibit good properties, the process suffers from two main drawbacks. The first drawback is that this process, if to be used on large scale, necessarily makes use of a full prepolymer having a very high viscosity, rendering it difficult to process. Lowering the level of prepolymerization lead to foams that tend to close. The second drawback is that this process is very sensitive to the presence of a polyol that has an EO content (generally as tipped) from 10 to 20% by weight. This polyol happens to be used in almost all kinds of foams and thus the equipment will always contain some of this polyol. Carrying out the process of this patent thus requires to clean the equipment very thoroughly before use.

U.S. Pat. No. 5,594,097 to Chaffanjon discloses specific polyols, having the structure PO-PO/EO-EO. One example makes use of a mixture of this polyol with an EO-rich polyol; the resulting foam is said to be of poor quality.

WO 94/24183 discloses the preparation of flexible polyurethane foams using a polyisocyanate containing at least 85% by weight of 4,4'-MDI and a polyol composition comprising 25 to less than 50% by weight of oxyethylene groups; prepolymers may be used as well. Only up to 50% by weight of other polyols may be used.

U.S. Pat. No. 5,677,361 to Treboux et al. discloses a process for making high resilience foams comprising reacting an isocyanate with a specific polyol composition, which comprises an EO-rich polyol, a classical polyol comprising tipped EO, and a polymer polyol. This process however uses the EO-rich polyol in minor amounts.

The instant invention aims at solving these problems and at providing a process which is not sensitive to PO-rich polyols (EO contents below 20%) and which is easy to carry out, and at providing reaction systems which are easily processable. The instant invention also aims at providing foams with high resilience and low compression set values, low hysteresis loss (lower than 20%), and with latex-like feel.

The invention thus provides a prepolymer process for preparing a high resilience flexible polyurethane foam at an NCO index of 70–120, preferably 70–110, by reacting:

a) a polyisocyanate composition comprising at least 80% by weight of 4,4'-MDI;

b1) a polyoxyethylene-polyoxypropylene polyol, having an average nominal hydroxy functionality of 2–6, where the EO is present as tipped EO and/or random EO, the total EO content being at least 50% by weight;

b2) a polyoxyethylene-polyoxypropylene polyol, having an average nominal hydroxy functionality of 2–6, where the EO is present as tipped EO and/or random EO, the total EO content being between 20–50% by weight, having a primary hydroxy content of at least 50%;

b3) a polyoxyethylene-polyoxypropylene polyol, having an average nominal hydroxyl functionality of 2–6, having a primary hydroxy content-of at least 50% and having an-EO content of from 10 to 20% by weight; these polyols b1, b2 and b3 being reacted according to the following proportions, based on the combined weights of b1, b2 and b3, b1: 40–90 wt %, b2: 5–60 wt %, b3: 0–20 wt %;

c) water; and d) additives and auxiliaries known per se;

and where the polyisocyanate prepolymer has an NCO value below 20% by weight.

The invention also relates to a reaction system comprising A) a polyisocyanate prepolymer obtained by reacting the polyisocyanate with part of the polyol composition of the invention, and B) an isocyanate-reactive component comprising the remainder of the polyol composition of the invention and water.

In the context of the present invention the following terms, if and whenever they are used, have the following meaning:

1) isocyanate index or NCO index:

the ratio of NCO-groups over isocyanate-reactive hydrogen atoms present in a formulation, given as a percentage $$\frac{[NCO] \times 100}{[\text{active hydrogen}]} \quad (\%)$$

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual foaming process involving the isocyanate ingredient and the isocyanate-reactive ingredients. Any isocyanate groups consumed in a preliminary step to produce modified polyisocyanates (including such isocyanate-derivatives referred to in the art as quasi or semi-prepolymers and prepolymers) or any active hydrogens reacted with isocyanate to produce modified polyols or polyamines, are not taken into account in the calculation of the isocyanate index. Only the-free-isocyanate groups and-the free isocyanate-reactive hydrogens (including those of the water) present at the actual foaming stage are taken into account.

2) The expression "isocyanate-reactive hydrogen atoms" as used herein for the purpose of calculating the isocyanate index refers to the total of hydroxyl and amine hydrogen atoms present in the reactive compositions in the form of polyols, polyamines and/or water; this means that for the purpose of calculating the isocyanate index at the actual foaming process one hydroxyl group is considered to comprise one reactive hydrogen, one primary or secondary amine group is considered to comprise one reactive hydrogen and one water molecule is considered to comprise two active hydrogens.

3) Reaction system: a combination of components wherein the polyisocyanate component is kept in a container separate from the isocyanate-reactive components.

4) The expression "polyurethane foam" as used herein generally refers to cellular products as obtained by reacting polyisocyanates with isocyanate-reactive hydrogen containing compounds, using foaming agents, and in particular includes cellular products obtained with water as reactive foaming agent (involving a reaction of water with isocyanate groups yielding urea linkages and carbon dioxide and producing polyurea-urethane foams).

5) The term "average nominal hydroxyl functionality" is used herein to indicate the average functionality (number of hydroxyl groups per molecule) of the polyol composition on the assumption that this is the average functionality (number of active hydrogen atoms per molecule) of the initiator(s) used in their preparation although in practice it will often be somewhat less because of some terminal unsaturation. The average equivalent weight of a polyol is the average molecular weight divided by this average nominal hydroxyl functionality.

6) The term "average" is used to indicate an average by number.

7) The term "high resilience foams" are intended to designate those foams having a resilience of at least 40%, as measured according to ISO 8307.

The following way of describing polyols is used in the present application: A PO-EO polyol is a polyol having first a PO block attached to the initiator followed by an EO block. A PO-PO/EO polyol is a polyol having first a PO block and then a block of randomly distributed PO and EO. A PO-PO/EO-EO polyol is a polyol having first a PO block then a block of randomly distributed PO and EO and then a block of EO. A PO-EO polyol is a polyol having first a PO block and then an EO block. In the above descriptions only one tail of a polyol is described (seen from the initiator); the nominal hydroxy functionality will determine how many of such tails will be present.

The polyisocyanate used in the prepolymer comprises at least 80% by weight of 4,4'-MDI (methylene diphenyl isocyanate).

The remaining part may comprise isomers thereof, higher functionalities oligomers thereof, variants thereof, or any other isocyanate (such as TDI). The isomers can be 2,4'-MDI and/or 2,2'-MDI. The oligomers are known, like e.g. polymeric MDI having isocyanate functionalities above 2. Variants thereof are known variants containing carbodiimide, uretonimine, isocyanurate, urethane, alophanate, urea and/or biuret groups. Most preferred isocyanates are pure 4,4'-MDI (isomer content less than 4% by weight), mixtures of 4,4'-MDI with polymeric MDI, mixtures of 4,4'-MDI with uretonimine and/or carbodiimide and/or urethane modified MDI.

The polyisocyanate may contain dispersed urea particles and/or urethane particles prepared in a conventional way, e.g. by adding a minor amount of an amine such as isophorone diamine to the polyisocyanate.

The prepolymer is obtained by standard methods known to the skilled man. The NCO value is below 20% by weight(the value of 20% by weight is excluded), for example from 7 to 20% by weight, preferably below 15% by weight. Preferred range is 7 to 15% by weight.

Polyol b1 is an EO rich polyol. It can be prepared by known methods. It comprises PO and EO, where the EO can be random, tipped, or both. Preferably the EO is random in majority. The EO content is greater than 50% by weight (over the total oxyalkylene units present).

Polyol b2 may have a structure of the type PO-PO/EO-EO or of the type PO/EO-EO or of the type PO-EO. The total EO content is from 20 to 50% by weight (over the total oxyalkylene units present), preferably from 21 to 45%. Polyol b2 has a primary OH content of at least 50%, preferably at least 70% based on the primary and secondary hydroxyl groups in the polyol. In the PO-PO/EO-EO type polyol, the first PO block comprises preferably from 20 to 75% by weight of the PO units. In those polyols b2) comprising both tipped and random EO, the weight ratio tipped EO/random EO preferably is from 1:3 to 3:1. The polyol having a structure of the type PO-PO/EO-EO can notably be produced according to the teaching of the Chaffanjon et al. U.S. Pat. No. 5,594,097. The polyol having a structure of the type -PO/EO-EO can notably be produced according to the teaching of the Hostettler U.S. Pat. No. 4,559,366. One example of a polyol b2) is one where the tipped EO content is from 10–20% by weight.

Polyol b3 is an optional polyol. It can be prepared by known methods. It has a primary hydroxy content of at least 50%, preferably at least 70%. It can be of various structures (PO-EO, PO/EO, etc.), where the EO can be either random, tipped, or both. The EO content is from 10 to 20% by weight (over the total oxyalkylene units present). A preferred polyol is one where EO is present as tipped EO.

The nominal functionality of these polyols b1, b2 and b3 is comprised between 2 and 6, preferably between 2 and 4.

The average equivalent weight of these polyols b1, b2 and b3 is generally comprised between 1000 and 4000, preferably 1500 and 3500.

The polyols are caused to react in the process according to the following proportions, expressed on the basis of the combined weights of the polyols:

b1: 40–90%, preferably 50–80% by weight
b2: 5–60%, preferably 10–40% by weight
b3: 0–20%, preferably 0–10% by weight.

Each component b1, b2 and b3 may be comprised of mixtures.

Dispersed material can also be present. This is known as polymer-modified polyol, and comprise e.g. SAN or PIPA (Poly Isocyanate Poly Addition), or PHD (polyurea suspension).

The polymer-modified polyols which are particularly interesting in accordance with the invention are products obtained by in situ polymerization of styrene and/or acrylonitrile in poly(oxyethylene/oxypropylene)polyols and products obtained by in situ reaction between a polyisocyanate and an amino- or hydroxy-functional compound (such as triethanolamine) in a poly(oxyethylene/oxypropylene) polyol. The solids content (based on the total polyol weight b1+b2+b3) can vary within broad limits, e.g. from 5 to 50%. Particle sizes of the dispersed polymer of less than 50 microns are preferred. Mixtures can be used as well.

Water is used as the blowing agent. Carbon dioxide may be added if needed. It is appropriate to use from 1.0 to 15%, preferably from 2 to 6%, by weight of water based on the weight of the total polyol component (prereacted and not prereacted, i.e. the total starting polyol or total starting isocyanate-reactive compounds), where the water can optionally be used in conjunction with carbon dioxide.

Other conventional ingredients (additives and/or auxiliaries) may be used in making the polyurethanes. These include catalysts, for example, tertiary amines and organic tin compounds, surfactants, cross linking or chain extending agents, for example, low molecular weight compounds such as diols, triols (having a molecular weight below the one of b3) and diamines, flame proofing agents, for example, halogenated alkyl phosphates, fillers-and pigments. Foam stabilizers, for example polysiloxane-polyalkylene oxide block copolymers, may be used to stabilize or regulate the cells of the foam.

The amount of these minor ingredients used will depend on the nature of the product required and may be varied within limits well known to a polyurethane foam technologist.

These components, notably the polyols b1, b2 and b3 can be added in any order, provided a prepolymer is used according to the NCO values indicated above. The polyols can be added one after the other, or part by part, in any order (for example, part of b1, then the remainder of b1 together with the all of b2+b3 or all of b2 then all of b1 then all of b3).

In one embodiment, the prepolymer is obtained with all the polyol b1, and no polyol b2 and b3, which are thus added in the resin side.

The components of the polyurethane forming reaction mixture may be mixed together in any convenient manner, for example the individual components may be pre-blended so as to reduce the number of component streams requiring to be brought together in the final mixing step. It is often convenient to have a two-stream system whereby one stream comprises the polyisocyanate prepolymer and the second stream comprises all the other components of the reaction mixture.

The flexible foams may be made according to the moulding or the slabstock technique. The foams may be preferably prepared by known moulding processes, hot or cold. The foams may be used in the furniture and automotive industries in seating, cushioning and mattresses.

The flexible foams thus obtained have a free rise density comprised between, e.g. 30 and 80 kg/m$^3$, preferably 35 and 65 kg/m$^3$. These foams show a resilience higher than about 45%, preferably higher than about 50%.

The invention also provides a reaction system that will enable the foam producer to make the desired foam by reacting the polyisocyanate and polyol compositions. This approach provides a relatively simple way to the customer to make a product from often a variety of chemicals by combining two compositions under appropriate conditions. The polyisocyanate component is the prepolymer, while the isocyanate-reactive component comprises the remainder of the polyol. Under this embodiment, any combination is foreseen. It covers notably the following possibilities: Part of b1+b2+b3 in the prepolymer, then the remainder of b1+b2+b3 in the isocyanate-reactive component; Part of b1+b2 but no b3, then the remainder of b1+b2 and all b3; Part of b1+b3 but no b2, then the remainder of b1+b3 and all b2; all of b1, then the all of b2+b3; all of b2, then the all of b1+b3; Part of b1, then the remainder of b1 together with the all of b2+b3; Part of b2, then the remainder of b2 together with the all of b1+b3. In one embodiment, the reaction system comprises A) a prepolymer obtained with all the b1 polyol and B) the remainder of the polyol and the other reactants.

The following examples illustrate the invention without limiting it.

Unless otherwise indicated, all parts are given by weight.

| Glossary (all functionalities are nominal functionalities) | |
|---|---|
| Polyol A | PO/EO, with EO as random. EO content is 75% by weight. Average equivalent weight is 1336. Functionality is 3, OH value is 42 mg KOH/g. |
| Polyol B | PO-PO/EO-EO, total EO content is 28,6% by weight. Tip EO content is 15% by weight. Average equivalent weight is 2004. Functionality is 3, OH value is 28 mg KOH/g. Primary OH content is 87%. |
| Polyol C | PO-PO/EO-EO, total EO content is 21% by weight. Tip EO content is 15% by weight. Average equivalent weight is. 2004. Functionality is 3, OH value is 28 mg KOH/g. Primary OH content is 83%. |
| Polyol D | PO/EO-EO, total EO content is 29.6% by weight. Tip EO content is 15% by weight. Average equivalent weight is 2004. Functionality is 3, OH value is 28 mg KOH/g. Primary OH content is 84%. |

-continued

| Glossary (all functionalities are nominal functionalities) | |
|---|---|
| Polyol E | PO-EO. with EO as tipped. EO content is 15% by weight. Average equivalent weight is 2004. Functionality is 3, OH value is 28 mg KOH/g. Primary OH content is 81%. |
| Polyol F | Polymer polyol, with 20% by weight of dispersed urethane solids from triethanolamine and uretonimine modified MDI in polyol E. |
| Polyol G | PEG having an average equivalent weight of 442. Functionality is 3. |
| Isocyanate A | Prepolymer based on pure 4,4'-MDI (functionality is 2) and polyol A. Functionality is 2.13. NCO value is 7.9% by weight. |
| Isocyanate B | Modified MDI comprising 72.8% by weight of MDI (2.0% of which is 2,4'-and 2,2') and 27.2% by weight uretonimine-modified MDI. Functionality is 2.12. NCO value is 29.3% by weight. |
| B4113 | Surfactant from Goldschmidt |
| Niax Al | Catalyst from Union Carbide |
| D33LV | Catalyst from Air Products |

Foams are produced according to the following scheme. Polyols, catalysts, surfactant and water are mixed prior to the addition of isocyanates. Polyol blends and isocyanates are mixed at 20° C. during 8 seconds before foaming. Free-rise foams are made in plastic buckets of 2.5 l to 10 l.

The properties of the foam are determined according to the following methods and standards:

Nature of cells:

| Recession (%) | |
|---|---|
| FRD (Free Rise Density) | ISO 845 |
| Foaming | |
| Cream Time (s) | |
| End Of Rise (s) | |
| Compression hardness | |
| CLD 40% (kPa) | ISO 3386-1 |
| Hysteresis Loss (%) | |
| Compression set (thickness) | ISO 1856 |
| Dry 75% (%) | |
| Humid 75% (%) | |
| Resilience (%) | ISO 8307 |
| Tear strength (N/m) | ISO 8067 |
| Max | |
| Tensile strength (kPa) | ISO 1798 |
| Elongation (%) | |

The results are summarized in the following tables.

|  | Examples | | | | | | | | | | | |
| --- | --- | --- | --- | --- | --- | --- | --- | --- | --- | --- | --- | --- |
| Component | 1 | 2 | 3 | 4 | 5 | 6 | 7 | 8 | 9 | 10 | 11 | 12 |
| Polyol A |  |  |  |  |  |  |  |  | 6 | 11 |  |  |
| Polyol B | 40 | 32 | 35 | 40 |  | 35 | 30 | 17 | 12 |  | 23 | 35 |
| Polyol C |  |  |  |  | 70 |  |  |  |  |  |  |  |
| Polyol D |  |  |  |  |  |  |  |  |  | 35 |  |  |
| Polyol E |  |  |  |  |  |  |  | 5 |  |  |  |  |
| Polyol F |  | 10 |  |  |  |  |  |  |  |  |  |  |
| Polyol G |  |  | 5 |  |  |  |  |  |  |  |  |  |
| Water | 3 | 2.6 | 3 | 4 | 3.3 | 2.5 | 2.5 | 2.2 | 2.2 | 2.5 | 2.2 | 2.5 |
| B 4113 |  | 1 | 0.5 | 0.5 |  | 0.5 | 0.5 | 0.5 | 0.5 | 0.5 | 0.5 | 0.5 |
| Niax Al |  |  |  |  |  | 0.1 | 0.1 |  |  | 0.1 | 0.1 | 0.1 |
| D 33 LV | 0.5 | 0.3 | 0.5 | 0.5 | 0.5 | 0.6 | 0.6 | 0.5 | 0.5 | 0.6 | 0.6 | 0.6 |
| Isocyanate A | 100 | 100 | 114 | 100 | 100 | 100 | 100 | 100 | 100 | 100 | 100 | 100 |
| Isocyanate B | 25 | 25 | 25 | 25 | 30 | 15 | 15 | 10 | 10 | 15 | 10 | 15 |
| NCO index | 100 | 97 | 106 | 77 | 98 | 97 | 97 | 98 | 98 | 97 | 98 | 97 |

|  | Examples | | | | | | | | | | | |
| --- | --- | --- | --- | --- | --- | --- | --- | --- | --- | --- | --- | --- |
| Properties | 1 | 2 | 3 | 4 | 5 | 6 | 7 | 8 | 9 | 10 | 11 | 12 |
| Cells | open* | open | open* | open* | open | open | open | open | open | open | open | open |
| Recession % | 0 | 0 | 0 | 0 | 1 |  |  |  | 6 | 1 | 20 | 10 | 2 |
| FRD (kg/cm³) | 42 | 58 | 47 | 41 |  | 45.8 | 51.1 | 54 | 55 |  |  |  |
| Foaming |  |  |  |  |  |  |  |  |  |  |  |  |
| Cream Time (s) |  |  |  |  |  | 16 | 16 |  |  |  |  |  |
| End Of Rise (s) |  |  |  |  |  | 93 | 97 |  |  | 160 | 153 | 69 | 85 | 103 |
| Compression hardness |  |  |  |  |  |  |  |  |  |  |  |  |
| CLD 40% (kPa) | 2.3 | 4.1 | 2.8 | 2 |  | 2.6 | 3.2 |  |  | 2.9 | 2.4 | 2.3 |
| Hysteresis (%) | 18.9 | 17.1 | 19.6 | 19.2 |  | 18.5 | 18.6 |  |  | 10.6 | 12.2 | 14.4 |
| Compression ser (Thick) |  |  |  |  |  |  |  |  |  |  |  |  |
| Dry 75% (%) |  |  |  |  |  |  |  |  |  | 6.5 | 3.3 | 4 |
| Humid 75% (%) |  |  |  |  |  |  |  |  |  | 1.4 | −2.3 | −1.7 |
| Resilience (%) | 58 | 62 | 51 | 48 |  |  |  | 62 | 51 | 53.6 | 52.5 | 47.5 |
| Tear strength |  |  |  |  |  |  |  |  |  |  |  |  |
| Max (N/m) |  |  |  |  |  |  |  |  |  | 151.8 | 135.4 | 156.9 |
| Tensile strengTh (kPa) |  |  |  |  |  |  |  |  |  | 60.3 | 43 | 56.7 |
| Elongation (%) |  |  |  |  |  |  |  |  |  | 99.9 | 102.4 | 126.3 |

*borderline

What is claimed:

1. A process for preparing a high resilience flexible polyurethane foam at an NCO index of 70–120, which process is a prepolymer process, by reacting:
   a) a polyisocyanate composition comprising at least 80% by weight of 4,4'-MDI;
   b1) a polyoxyethylene-polyoxypropylene polyol, having an average nominal hydroxy functionality of 2–6, where the EO is present as tipped EO and/or random EO, the total EO content being at least 50% by weight;
   b2) a polyoxyethylene-polyoxypropylene polyol, having an average nominal hydroxy functionality of 2–6, where the EO is present as tipped EO and/or random EO, the total EO content being between 20–50% by weight, having a primary hydroxy content of at least 50%; and optionally
   b3) a polyoxyethylene-polyoxypropylene polyol, having an average nominal hydroxyl functionality of 2–6, having a primary hydroxy content of at least 50%, and having a EO content of from 10 to 20% by weight; these polyols b1, b2 and b3 being reacted according to the following proportions, based on the combined weights of b1, b2 and b3, b1: 40–90 wt %, b2: 5–60 wt %, b3: 0–20 wt %;
   c) water; and
   d) additives and auxiliaries known per se;
   and where a polyisocyanate prepolymer is used which has an NCO value below 20% by weight.

2. The process of claim 1, wherein polyols b1, b2, and b3 are reacted according to the following proportions, based on the combined weights of b1, b2 and b3, b1: 50–80 wt %, b2: 10–40 wt %, b3: 0–10 wt %.

3. The process of claim 1, wherein the polyol b2 is of the -PO-PO/EO-EO type.

4. The process of claim 2, wherein the polyol b2 is of the -PO-PO/EO-EO type.

5. The process of claim 1, wherein the polyol b2 is of the -PO/EO-EO type.

6. The process of claim 2, wherein the polyol b2 is of the -PO/EO-EO type.

7. The process of claim 1, wherein the polyol b2 is of the -PO-EO type.

8. The process of claim 2, wherein the polyol b2 is of the -PO-EO type.

9. The process of claim 1, wherein the functionality of the polyols b1, b2, and b3 is 2–4.

10. The process of claim 2, wherein the functionality of the polyols b1, b2, and b3 is 2–4.

11. The process of claim 3, wherein the functionality of the polyols b1, b2, and b3 is 2–4.

12. The process of claim 5, wherein the functionality of the polyols b1, b2, and b3 is 2–4.

13. The process of claim 7, wherein the functionality of the polyols b1, b2, and b3 is 2–4.

14. The process of claim 1, wherein the polyols b1, b2, and b3 further comprise dispersed particles.

15. The process of claim 2, wherein the polyols b1, b2, and b3 further comprise dispersed particles.

16. The process of claim 1, wherein the NCO value is from 7 to 15% by weight.

17. The process of claim 2, wherein the NCO value is from 7 to 15% by weight.

18. The process of claim 3, wherein the NCO value is from 7 to 15% by weight.

19. A reaction system comprising A) a polyisocyanate prepolymer having an NCO value of from 7 to 20% by weight, obtained by reacting a polyisocyanate with part of a polyol composition, and B) an isocyanate-reactive component comprising the remainder of the polyol composition and water, wherein the polyol composition comprises:

b1) a polyoxyethylene-polyoxypropylene polyol, having an average nominal hydroxy functionality of 2–6, where the EO is present as tipped EO and/or random EO, the total EO content being at least 50% by weight;

b2) a polyoxyethylene-polyoxypropylene polyol, having an average nominal hydroxy functionality of 2–6, where the EO is present as tipped EO and/or random EO, the total EO content being between 20–50% by weight, having a primary hydroxy content of at least 50%; and optionally b3) a polyoxyethylene-polyoxypropylene polyol, having an average nominal hydroxyl functionality of 2–6, having a primary hydroxy content of at least 50%, and having an EO content of from 10 to 20% by weight;

these polyols b1, b2 and b3 being used according to the following proportions, based on the combined weights of b1, b2 and b3, b1: 40–90 wt %, b2: 5–60 wt %, b3 0–20 wt %.

20. The reaction system of claim 19, wherein the polyisocyanate prepolymer is obtained by reacting the polyisocyanate with b1.

* * * * *